United States Patent [19]

Gingell

[11] Patent Number: 5,105,421
[45] Date of Patent: Apr. 14, 1992

[54] SYSTEM FOR CONTROLLING MULTIPLE LINE CARDS ON A TDM BUS

[75] Inventor: Michael J. Gingell, Raleigh, N.C.

[73] Assignee: Alcatel NA Network Systems Corp., Raleigh, N.C.

[21] Appl. No.: 451,431

[22] Filed: Dec. 15, 1989

[51] Int. Cl.$^5$ .............................................. H04J 3/02
[52] U.S. Cl. ................................... 370/67; 370/85.1
[58] Field of Search ............... 370/67, 85.1, 85.7, 370/95.1, 85.9, 58.1

[56] References Cited

U.S. PATENT DOCUMENTS

| | | | |
|---|---|---|---|
| 4,370,743 | 1/1983 | Moran | 370/67 |
| 4,385,379 | 5/1983 | Kelly et al. | 370/67 |
| 4,891,805 | 1/1990 | Fallin | 370/95.1 |
| 4,953,159 | 8/1990 | Hayden et al. | 370/85.1 |
| 4,998,249 | 3/1991 | Bennett et al. | 370/95.1 |

Primary Examiner—Douglas W. Olms
Assistant Examiner—Min Jung
Attorney, Agent, or Firm—Ware, Fressola, Van Der Sluys & Adolphson

[57] ABSTRACT

In a TDM telecommunications terminal, wherein multiple line cards are connected to a TDM bus, each line card location is provided with an identification code. A processor controlled circuit generates a programmable sequence of identification codes which are transmitted on a configuration bus in time slots synchronized with the time slots of the TDM bus. The configuration bus is connected to each of the line cards, which include a comparator logic circuit for comparing the identification of the line card location to the identification codes provided on the configuration bus. When a match is detected, the line card is enabled and is given access to the TDM bus. Through the programmable reassignment of time slots to line cards, concentration may be provided by the system, and a plurality of time slots may be assigned to a single line card to provide broad band service.

27 Claims, 2 Drawing Sheets

[5,105,421]

SYSTEM FOR CONTROLLING MULTIPLE LINE CARDS ON A TDM BUS

BACKGROUND OF THE INVENTION

1. Field of the Invention

The present invention relates to the control of a TDM bus and, more particularly, to a system for controlling line cards in a telecommunications terminal for multiplexing and demultiplexing subscriber line information to and from a TDM bus.

2. Description of the Prior Art

In telephony, time division multiplexing (TDM) is used as a method for transmitting information from several subscriber lines or ports over a single telephone transmission line. The information for each subscriber is multiplexed onto and demultiplexed from time slots or channels on the TDM bus. Thus, a time slot or channel on the TDM bus must be provided for each subscriber line serviced by the TDM bus. As a practical matter, only a limited number of time slots are available on a TDM bus, as the time slots must be repeated periodically in order to convey the subscriber line information without interruption. Thus, TDM buses transmit information in repeated frames comprising a fixed number of time slots or channels.

Heretofore, in most cases a fixed time slot was assigned to each subscriber line for transmitting and receiving subscriber line information. A fixed timing signal in the form of a strobe was supplied to each line card serving a subscriber line, so that information from the subscriber line would be multiplexed onto or demultiplexed from the TDM bus only during the fixed, assigned time slot.

An alternative method used previously was to have timing logic on each card that could programmably deliver the channel in an assigned time slot with respect to a reference synchronization pulse. This required a communication channel to each card and some method so that each card can identify a message unique to it. Clearly, this method was cumbersome and complex.

The prior art systems did not provide a convenient method for the reassignment of time slots and therefore the systems were rather rigid and inflexible. Concentration could not be easily accommodated, since a time slot was fixedly assigned to each subscriber line. Advantage could not be taken of the fact that not all subscriber lines are used simultaneously. In addition, the prior art systems could not service subscriber lines requiring the transmission of high-speed digital information beyond the bandwidth capability of an individual time slot. Thus, higher speed telephone transmission lines had to be dedicated to subscribers requiring the transmission of high-speed digital information.

The provision of individual strobe signals to each of the line circuits created a wiring nightmare, in that separate strobe lines had to be extended to each of the line cards, resulting in large wiring harnesses and timing irregularities that can result from excessively long strobe lines.

SUMMARY OF THE INVENTION

The present invention contemplates a system for the programmable control of multiple line cards in a telecommunications terminal; however, it is to be understood that the present invention, while being described in the environment of a telecommunications terminal, is equally applicable to any facility having multiple ports connected to a TDM bus.

The system of the present invention provides flexibility to assign one or more time slots on a TDM bus on an as-required basis to any line card. Time slots previously assigned to a particular line card may be reassigned when the original assignment is no longer required; and multiple time slots may be assigned to a line card where a wider bandwidth is required than that normally provided by an individual time slot.

The above advantages and benefits of the present invention are realized in a telecommunications terminal having a line shelf in which there are provided slots into which numerous types of line cards can be inserted. Each slot is provided with a unique address in the form of an identification code, so that time slots may be individually assigned to any particular physical slot address.

A microprocessor programmably generates a sequence of identification codes for transmission on a configuration bus which is connected to each line card. The identification codes are transmitted synchronously with the time slots of its TDM bus. Each line card compares the identification code of the slot in which it is inserted with the identification code being transmitted on the configuration bus. When a match is sensed, the line card is activated to multiplex and/or demultiplex information to and from the TDM bus for its associated subscriber line.

The microprocessor has complete control over the identification code sequence, thereby assigning any time slot to any card. By merely transmitting the same identification code repeatedly, a plurality of time slots is assigned to the same subscriber line.

Thus, the present invention provides complete flexibility in assigning time slots to line cards, allowing for concentration and the provision of broadband services to individual subscriber lines. The use of a single configuration bus eliminates need for separate strobe lines to each line card, thereby minimizing the wiring requirements and eliminating the electrical perturbations which inherently result from numerous and lengthy strobe lines.

A primary objective of the present invention is to provide a system for controlling multiple line cards on a TDM bus, wherein the time slots of the TDM bus may be freely assigned to the line cards.

Another objective of the present invention is to provide a system wherein the assignment of time slots to line cards is programmably controlled.

Another objective of the present invention is to provide a system wherein multiple time slots may be assigned to a single line card to provide greater bandwidth for the associated subscriber line.

Another objective of the present invention is to provide a system that will allow for concentration of subscriber lines connected to a TDM bus.

DETAILED DESCRIPTION OF THE PREFERRED EMBODIMENT

Figure 1:
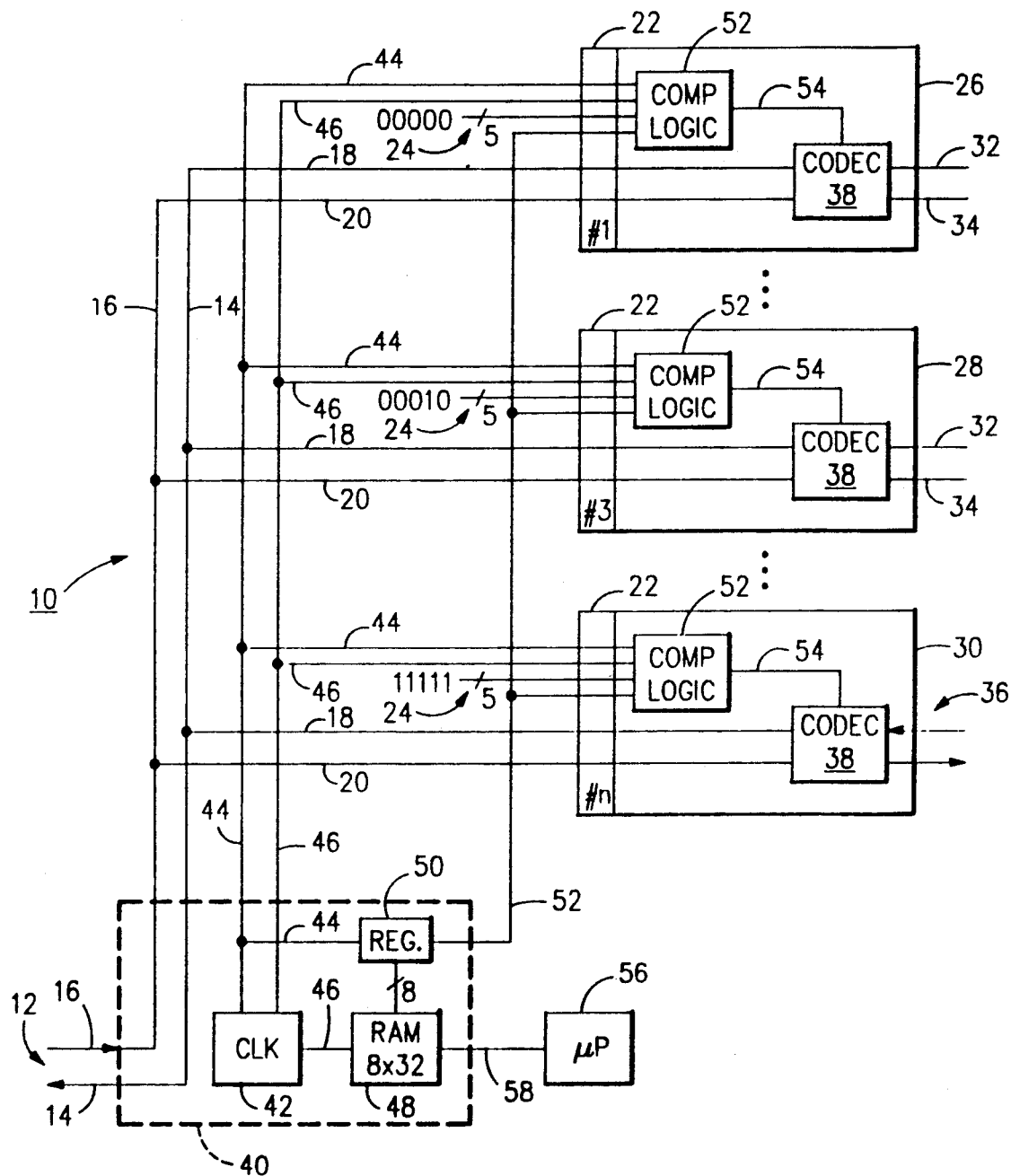
FIG. 1 is a block diagram of the present invention as embodied in a telecommunications terminal.

Referring to FIG. 1, there is shown a block diagram of the system 10 for controlling multiple line cards on a TDM bus 12. The TDM bus includes a transmit line 14 and a receive line 16 for transmitting and receiving PCM codec signals contained in 32 time slots.

The bus 12 extends along the back plane of a line shelf and is connected via transmit and receive lines 18 and 20 respectively, to lien shelf connectors 22 for receiving line cards. Each connector has five sockets or pins allocated for establishing an identification code for a line shelf slot associated with the connector. The identification code is a five-bit binary number established by straps that hard-wire the sockets to selected 1- or 0- logic level signals.

Shown in FIG. 1 are three connectors 22 of a plurality n of connectors. A first connector is shown at 24 as having five leads connected to produce the binary number 00000 as an identification code. A third connector has an identification code of 00010, while the nth connector may have an identification code of 11111. Thus, each line shelf slot has a preassigned, fixed identification code.

A plurality of line cards are inserted in the various slots of the line shelf, with line card 26 being inserted into the first connector, line card 28 inserted into the third connector, and line card 30 being inserted into the nth connector. For the sake of discussion, line cards 26 and 28 will be considered to be serving a normal POTS (plain old telephone service) subscriber line for handling analog VF (voice frequency) signals appearing on tip/ring pairs represented by lines 32 and 34. Line card 30 is connected to a subscriber line 36, which carries digital data at a high speed and requires a bandwidth greater than that available from a single time slot. The data rate of subscriber line 36 is such that two adjacent time slots are required to provide sufficient bandwidth.

Each line card 26, 28 and 30 includes a codec 38 for coding and decoding the transmitted and received information to and from PCM formatted data. Each codec 38 additionally includes a gate means for passing subscriber information to and from lines 18 and 20 connected to the TDM bus.

A common control circuit 40 generates timing signals for the line cards and a sequence of identification codes in synchronization with the time slots of the TDM bus 12. The common control circuit 40 includes a clock circuit 42 synchronized with the TDM bus for generating a 2.048 MHz clock signal representing the bit rate of the system, and a 256 KHz byte clock signal representing the channel rate of the system. Thus, in a system having 32 channels of eight bits each, a frame rate of 8 KHz is provided. A clock bus 44 distributes the 2.048 MHz clock signal to all of the line cards, while a byte clock bus 46 distributes the channel rate of 256 KHz to the various line cards.

A random access memory (RAM) 48 has a storage capability of 32 words, each eight bits long, for storing configuration words for the line cards. Each eight-bit word contains a five-bit identification code for the purpose of identifying a line shelf slot that is being addressed. The extra three bits may be used for further identification or control purposes, as for example, identification of which of two channels served by a single line card is to be activated.

A parallel input-serial output register 50 is parallelly connected to RAM 48. The eight-bit configuration words stored in RAM 48 are sequentially clocked into a register 50 in response to the byte clock signal from clock circuit 42. Register 50 outputs each eight-bit word serially onto a configuration bus 52 in response to the bit clock signal on bus 44. Thus, configuration bus 52 is provided with a sequence of eight-bit serial configuration words, said sequence being determined by the order in which the words are stored in RAM 48. The configuration bus 52 extends along the back plane of the line shelf and is connected to each of the connectors 22.

Each line circuit includes a comparator logic circuit 52 which receives the five-bit identification code established by the straps at 24 of the connector, the clock signal on bus 44, the channel rate signal on bus 46, and the configuration words on configuration bus 52. Each comparator logic circuit 52 clocks in the configuration words from configuration bus 52 and compares the identification code received on the configuration bus 52 with the identification code assigned to the connector 22. When a match is sensed, the logic circuit 52 provides an output indicative of a match upon the occurrence of the leading edge of byte clock pulse on bus 46. Logic circuit 52 provides its output on line 54, which is connected to the gate means in codec 38, to gate the PCM signal to or from and TDM bus 12 during the assigned time slot.

The above-described system would provide fixed time slots for each line card in accordance with the identification codes stored in the words of RAM 48.

A unique feature of the present invention is the provision of a microprocessor 56 connected to RAM 48 via a line 58 for loading configuration words into the various storage bytes of RAM 48.

Microprocessor 56 can load into RAM 48 32 configuration words, one for each of the 32 channels in the TDM bus frame. The microprocessor can thus control the time slot or channel to which a particular subscriber line is assigned, or may assign multiple consecutive time slots to a single subscriber to provide wide band capability.

From the above, it can be seen that it is possible to provide more connectors and line shelf slots in a line shelf than there are time slots available on the TDM bus, thereby taking advantage of the fact that not all subscribers are constantly receiving or transmitting data. This feature allows the present invention to act as a concentrator; however, as a concentrator, substantially greater microprocessor capability would be required than would be needed if the concentration feature were not used.

Figure 2:
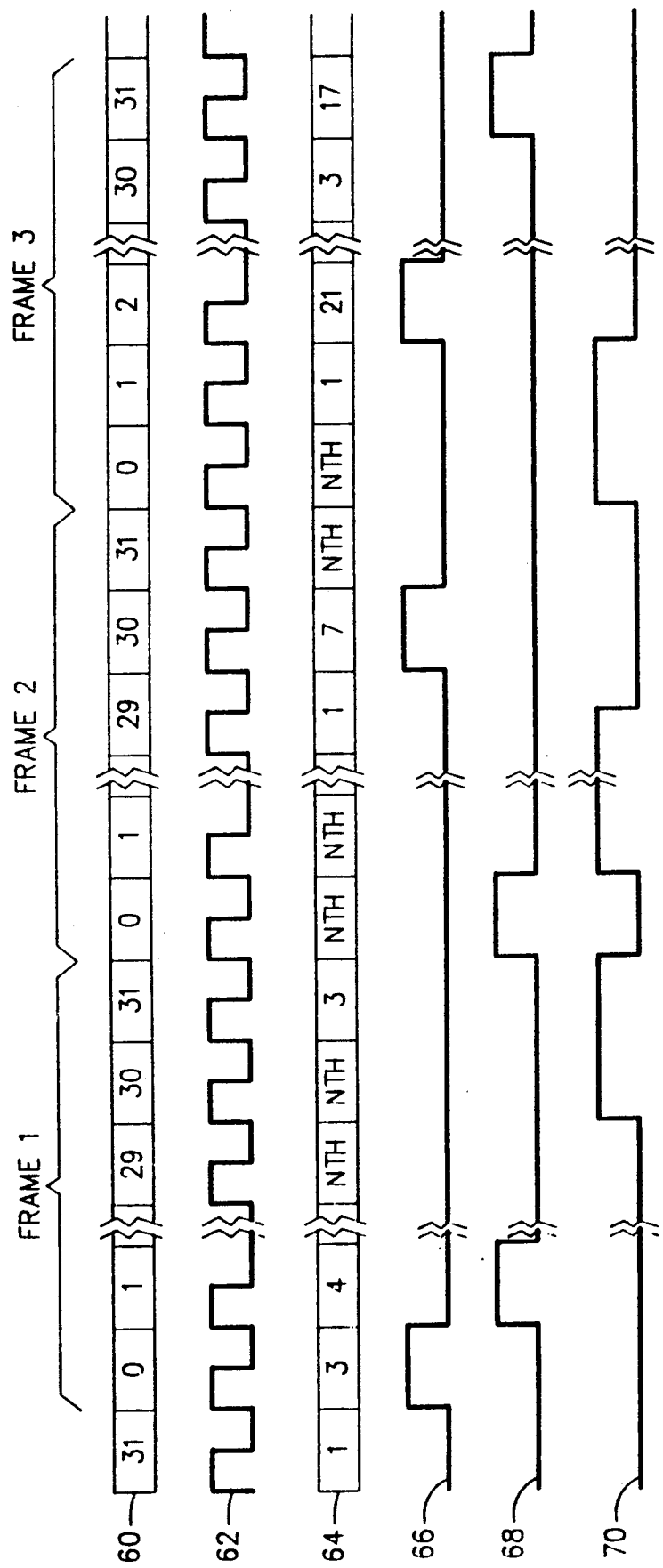
FIG. 2 is a timing diagram illustrating the timing utilized in the system of FIG. 1.

Referring to FIG. 2, there is shown a timing diagram for the system of FIG. 1. Line 60 illustrates a portion of time slots 0-31 for each of three frames of PCM data to be transmitted on one of the lines of the TDM bus 12. Line 62 illustrates the byte clock signal which is in synchronization with the time slots of the TDM bus shown on line 60. The rising leading edge of the pulses on line 62 provides the timing for the comparator logic circuit 52 to provide the output on line 54 to the gate means contained within the codec 38. The byte clock shown on line 62 is also used to control RAM 48 and the shifting of configuration words from the RAM to the register 50. Line 64 illustrates a possible sequence of configuration words as provided on configuration bus 52. The numbers shown in the time slots on line 64 correspond to the connector numbers in the line shelf. Lines 66, 68 and 70 illustrate the time slots of line 60 during which data will be gated to and from the TDM bus by line cards 26, 28 and 30 respectively.

As shown on line 64, the identification code for connector 1 is transmitted during TDM bus time slot 31 and is accumulated within the compare logic circuit 52 during that time slot. If a match is identified, the gate means in the codec 38 for line card 26 will be enabled during the next TDM bus time slot, which is shown as time slot 0 on line 60 and is indicated by a high-level signal on line 66 during time slot 0. In like manner, the code for connector 3 is transmitted in the second time slot on line 64, to thereby enable the gate means of line card 28 during TDM bus time slot 1 and is indicated by the high-level signal on line 68 during TDM bus time slot 1. The identification code for the nth connector, into which line card 30 is inserted, is repeated on the configuration bus for two consecutive TDM bus time slots 29 and 30, so that the gate means in codec 38 of line card 30 is enabled during time slots 30 and 31, as shown on line 70.

From the above, it is apparent that the configuration word on bus 52 must be transmitted prior to the assigned TDM bus time slot. A delay of one or more time slots can be used.

Thus, it is apparent that the system of the present invention can assign any line card to any particular time slot or a plurality of time slots, as may be required by the needs of the subscriber line. The assignment of time slots is programmably controlled by the microprocessor 56 and provides flexibility not heretofore realized in the prior art. The multi-channel assignment feature is particularly useful for future ISDN requirements.

In the described embodiment, it is contemplated that the gate means of each codec 38 will simultaneously transmit and receive PCM data to and from lines 14 and 16 of the TDM bus. It is possible that additional bits in the configuration words could be used to identify the separate transmit and receive functions, in which case the comparator logic 52 would provide one output for transmitting and one for receiving information to and from the TDM bus. It is also envisioned that the extra bits in the configuration word could be used to code an offset time so that the information is transmitted and received in different time slots offset by an amount determined in accordance with the offset code. In many cases, two subscriber lines are connected to each line circuit, and the additional bits could be used to identify which of the two line circuits is assigned to the particular time slot.

The present invention could be equally applicable to a system wherein the identification code is transmitted on the same bus as the PCM data, and other information relating to a subscriber line. In such a case, the various channels on the TDM bus would be divided into sub-channels, with a first sub-channel being dedicated to the transmission of the identification code, followed by other sub-channels for the transmission of PCM data and other information, such a signaling and provisioning information for the particular line card.

Thus, it can be seen that the programmable control of the present invention has many possible uses in telephony, and is applicable to other types of systems using TDM buses. The present invention provides a system for controlling multiple line cards on a TDM bus, wherein the time slots of the TDM bus may be freely assigned to the line cards, the assignment of time slots to line cards is programmably controlled, multiple time slots may be assigned to a single line card to provide greater bandwidth for the associated subscriber line, and wherein the control system that will allow for concentration of subscriber lines connected to a TDM bus.

What is claimed is:

1. A system for multiplexing information from a plurality of ports each having a physical position identification code onto a TDM bus for transmitting said information in time slots on said bus, said system comprising:
a processor controlled means for selectively generating and outputting physical position identification codes during time slots of said TDM bus;
a distributing means connected to said processor controlled means for distributing said physical position identification codes through said system; and
connecting means associated with each of said ports for connecting information from said ports to said TDM bus, each said connecting means assuming the physical position identification code of the associated port and being connected to said distributing means, said connecting means being responsive to the presence of its assumed physical position identification code on said distributing means to connect the information from its associated port to the TDM bus, whereby each connecting means connects information from its associated port to said TDM bus in a time slot when said physical position identification code on said distributing means matches its physical position identification code assumed by the connecting means.

2. A system as described in claim 1, wherein said TDM bus has first and second lines for transmitting and receiving information respectively, and said system is further suitable for receiving and demultiplexing information form time slots on said receiving line of said TDM bus, each connecting means being further responsive to its assumed physical position identification code on said distributing means to connect information from a time slot on said TDM bus to its associated port.

3. A system as described in claim 1, wherein said system is adapted for telecommunications, and each of said ports is connected to a subscriber line.

4. A system as described in claim 3, wherein at least one of said subscriber lines comprises a tip and ring pair for conveying analog information signals.

5. A system as described in claim 1, wherein each connecting means further comprises means connected to said ports for converting said information to PCM format for transmission on said TDM bus.

6. A system as described in claim 2, wherein each connecting means further comprises means connected to said ports for converting said information to PCM format for transmission on said TDM bus and means connected to said receive line of each TDM bus for converting PCM format information in time slots to analog information for said ports.

7. A system as described in claim 1, wherein the distributing means comprises a separate physical position identification code bus.

8. A system as described in claim 2, wherein the distributing means comprises a separate physical position identification code bus.

9. A system as described in claim 7, wherein said processor controlled means further comprises a timing generator connected to each connecting means for generating timing signals corresponding to said time slots on said TDM bus.

10. A system as described in claim 9, wherein said processor controlled means comprises a random access memory connected to said timing generator and said physical position identification code bus for storing said identification codes to be distributed through said system.

11. A system as described in claim 10, wherein said processor controlled means further comprises a microprocessor connected to said random access memory for loading said physical position identification codes into said random access memory.

12. A system as described in claim 11, wherein said processor controlled means further comprises a register connected to said random access memory and said physical position identification code bus, said register receiving physical position identification codes in parallel from said random access memory and providing said physical position identification codes to said physical position identification code bus in serial form.

13. A system as described in claim 8, wherein said processor controlled means further comprises a timing generator connected to each connecting means for generating timing signals corresponding to said time slots on said TDM bus.

14. A system as described in claim 13, wherein said processor controlled means comprises a random access memory connected to said timing generator and said physical position identification code bus for storing said physical position identification codes to be distributed through said system.

15. A system as described in claim 14, wherein said processor controlled means further comprises a microprocessor connected to said random access memory for loading said identification codes into said random access memory.

16. A system as described in claim 15, wherein said processor controlled means further comprises a register connected to said random access memory and said physical position identification code bus, said register receiving physical position identification codes in parallel from said random access memory and providing said physical position identification codes to said physical position identification code bus in serial form.

17. A system as described in claim 2, wherein said system is adapted for telecommunications, and each of said ports is connected to a subscriber line.

18. A system as described in claim 9, wherein said timing signals comprise a byte clock having a rising and a falling edge, said rising edge corresponding to the beginning of a time slot.

19. A system as described in claim 1, wherein said assumed Physical Position identification codes for the connecting means are multi-digit binary numbers and are fixed in said connecting means.

20. A system as described in claim 3, wherein each connecting means is a line card inserted in a connector in a line shelf.

21. A system as described in claim 20, wherein said assumed physical position identification codes are multi-digit binary numbers established for each connector of a line shelf by hard-wiring multiple sockets of each connector to 1 and 0 logic level signals to form the physical position identification code.

22. A system as described in claim 1, wherein each connecting means further comprises:
comparator means for comparing the assumed physical position identification code of the connecting means with the physical position identification code on the distributing means, and for providing an output in response to a match; and
gating means connected to the comparator means and responsive to the output therefrom for connecting the information from the port to the TDM bus.

23. A system as described in claim 2, wherein each connecting means further comprises:
comparator means for comparing the assumed physical position identification code of the connecting means with the physical position identification code on the distributing means, and for providing an output in response to a match; and
gating means connected to the comparator means and responsive to the output therefrom for connecting the information from its associated port to the TDM bus and for connecting the information from a time slot on said TDM bus to its associated port.

24. A system as described in claim 1, wherein the time slots have predetermined bandwidth, and said processor controlled means generates and outputs the same physical position identification code during a plurality of adjacent time slots, whereby a greater bandwidth is provided to the port associated with the connecting means whose identification code was outputted in multiple time slots.

25. A system as described in claim 2, wherein the time slots have predetermined bandwidth, and said processor controlled means generates and outputs the same physical position identification code during a plurality of adjacent time slots, whereby a greater bandwidth is provided to the port associated with the connecting means whose physical position identification code was outputted in multiple time slots.

26. A system as described in claim 1, wherein there are more ports than time slots, and concentration is provided.

27. A system as described in claim 2, wherein there are more ports than time slots, and concentration is provided.

* * * * *

UNITED STATES PATENT AND TRADEMARK OFFICE
CERTIFICATE OF CORRECTION

PATENT NO. :   5,105,421
DATED      :   April 14, 1992
INVENTOR(S):   M. Gingell It is certified that error appears in the above-identified patent and that said Letters Patent is hereby corrected as shown below:

At column 7, line 27, after "loading said", please insert --physical position--.

At column 7, line 46, please change "Physical Position" to --physical position--.

At column 8, line 35, after "means whose", please insert --physical position--.

Signed and Sealed this

Tenth Day of August, 1993

Attest:

MICHAEL K. KIRK

Attesting Officer    Acting Commissioner of Patents and Trademarks